United States Patent [19]
Hirosawa

[11] Patent Number: 5,257,327
[45] Date of Patent: Oct. 26, 1993

[54] METHOD OF AND APPARATUS FOR FORMING A ONE-PAGE-IMAGE

[75] Inventor: Makoto Hirosawa, Kyoto, Japan

[73] Assignee: Dainippon Screen Mfg. Co., Ltd., Kyoto, Japan

[21] Appl. No.: 708,018

[22] Filed: May 31, 1991

[30] Foreign Application Priority Data

Jun. 27, 1990 [JP] Japan ................. 2-168962

[51] Int. Cl.$^5$ ............................. G06K 9/36
[52] U.S. Cl. ........................ 382/56; 382/61; 358/452
[58] Field of Search ............ 382/41, 56, 57, 61; 358/450, 452, 467

[56] References Cited

U.S. PATENT DOCUMENTS

| | | | |
|---|---|---|---|
| 4,742,558 | 5/1988 | Ishibashi et al. | 382/56 |
| 5,020,122 | 5/1991 | Walsch et al. | 382/61 |
| 5,027,421 | 6/1991 | Kanno | 382/61 |
| 5,029,228 | 7/1991 | Nonoyama et al. | 382/56 |
| 5,038,392 | 8/1991 | Morris et al. | 382/61 |
| 5,119,081 | 6/1992 | Ikehira | 382/61 |
| 5,121,448 | 6/1992 | Katayama et al. | 382/57 |
| 5,129,011 | 7/1992 | Nishikawa et al. | 382/56 |

FOREIGN PATENT DOCUMENTS

| | | |
|---|---|---|
| 0309196 | 9/1988 | European Pat. Off. |
| 0351062 | 6/1989 | European Pat. Off. |
| 2129647 | 8/1983 | United Kingdom |

*Primary Examiner*—Jose L. Couso
*Attorney, Agent, or Firm*—Lowe, Price, LeBlanc & Becker

[57] ABSTRACT

Layout editor 5 stores a set of compressed image data d1, reference image data d2 corresponding to a skipped image, and management data d3 for each picture element read by reading scanner 1. The editor displays an image of the picture element based on the reference image data d2 on a terminal device 13, obtain layout data d4 specified by an operator together with cutout data d5, and stores the data d4 and d5 in the magnetic disk unit for each picture element. An output processing unit 7 lays out picture elements according to the layout data and the cutout data in a one-page-image, and outputs the laid-out page data to a recording scanner 9. Compressed data and skipped data, but not original image data, are used in laying out picture elements in a one-page-image; this reduces the data volume handled in the layout operation.

4 Claims, 7 Drawing Sheets

METHOD OF AND APPARATUS FOR FORMING A ONE-PAGE-IMAGE

BACKGROUND OF THE INVENTION

1. Field of the Invention

The present invention relates to an image processing method and a system therefor for reading picture elements to obtain their image data, making up a one-page-image through laying out the picture elements in desired positions to produce image data of the one-page-image, and outputting the image data of the one-page-image.

2. Description of the Prior Art

Recently, in the field of prepress, scanners so-called layout systems have become popular. The layout system is a computer-aided image processing system for page make-up processing; the layout system performs the processing between processings in an input scanning and color-tone correction part and in an image recording part of a color scanner. Such a system is designed to increase the page make-up processing speed and the labor saving effect, and to reduce material consumption.

FIG. 1 shows the conceptual structure of a layout system. The layout system consecutively scans picture elements which will be used in a one-page-image with a reading scanner A1, corrects color tone of the picture elements, and temporarily stores the obtained image data on a magnetic disk A2 as original image data. A layout editor A3 then reads the stored original image data, carries out a page make-up operation and other additional operations as needed, such as color correction of the images, and then stores the page-make-up processed image data on another magnetic disk A4 (or on the same disk A2). The page-make-up processed image data is transmitted to a recording scanner A5 to record the one-page-image on a film.

A layout system is available with a function of image transmission by telecommunication. Such type of a layout system compresses the page-make-up processed image data stored on the magnetic disk A4 by a compression-restoration unit A6, stores the compressed image data on a magnetic disk A7 and transmits the compressed image data to the outside by a communication unit A8.

The conventional layout systems require that the magnetic disks A2 and A4 and the main storage device in the layout editor A3 have capacities for processing a large volume of data. In addition, high-quality representation of a picture image, such as a photograph, needs enormous data. Therefore an ordinary DTP (desk-top publishing) system, using a general-purpose microcomputer or a work station, is not able to form a one-page-image with a high-quality picture element due to insufficient data volume capacity.

Although image data compression processing is known as a technique for reducing data volume in the field of image communication, it has not been found to be efficient enough for application to page-make-up processed image data because the data volume cannot be sufficiently reduced.

SUMMARY OF THE INVENTION

An object of the present invention is to reduce the data volume to be handled in the image layout processing, thereby enabling the formation of a one-page-image, including a high-quality picture element, in a small-scale system based on a microcomputer or a work station.

The present invention is directed to an image processing system and a method therefor for forming a one-page-image including a picture element. The system comprises:

input means for obtaining image data of a picture element to be laid out in a one-page-image;

compression means for compressing the image data to produce compressed image data;

skipping means for skipping the image data to produce reference image data representing a skipped image;

data storage means for storing the compressed image data;

layout means for laying out the skipped image on the one-page-image to produce layout position data representing a position of the skipped image in the one-page-image;

restoration means for restoring the compressed image data stored in the data storage means to produce restored image data; and page-make-up means for forming the one-page-image based on the restored image data and the layout position data.

Preferably the layout means comprises a monitor and a coordinate input device for specifying positions on the one-page-image, and the layout means displays the skipped image based on the reference image data on the monitor and obtains the layout position data from the position of the skipped image specified with the coordinate input device.

The layout means may also produce cutout data representing a shape of a cutout area of the skipped image, part of the skipped image within the cutout area being laid out on the one-page-image, and the page-make-up means forms the one-page-image based on the restored image data, the layout position data and the cutout data.

The system may comprises means for storing the layout position data and the cutout data as a data set for each picture element.

The system may further comprises management data production means for producing management data to indicate a method of data compression in the compression means, and wherein the restoration means may restore the compressed image data according to a method indicated by the management data.

In addition, the layout position data may further include parameters for affine conversion of the skipped image in the one-page-image.

Moreover, the input means may comprise image data storage means for storing plural sets of image data representing picture elements usable as parts of the one-page-image, and pick up the image data of the image element to be laid out from the image data storage means.

These and other objects, features, aspects and advantages of the present invention will become more apparent from the following detailed description of the present invention when taken in conjunction with the accompanying drawings.

BRIEF DESCRIPTION OF THE DRAWINGS

In the accompanying drawings.

DESCRIPTION OF THE PREFERRED EMBODIMENT

Figure 1:
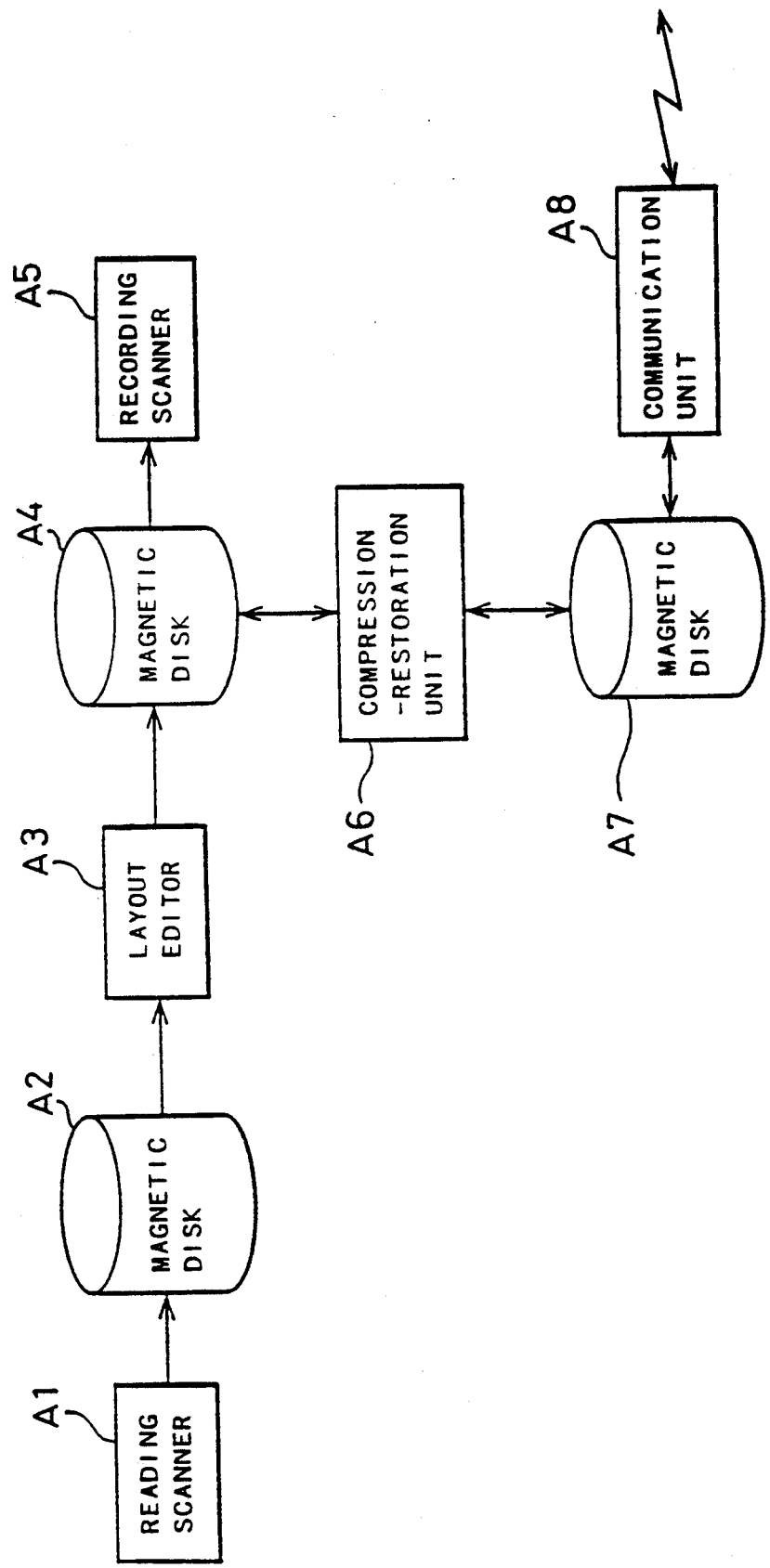
FIG. 1 shows the block diagram of a conventional layout scanner system configuration.
Figure 2:
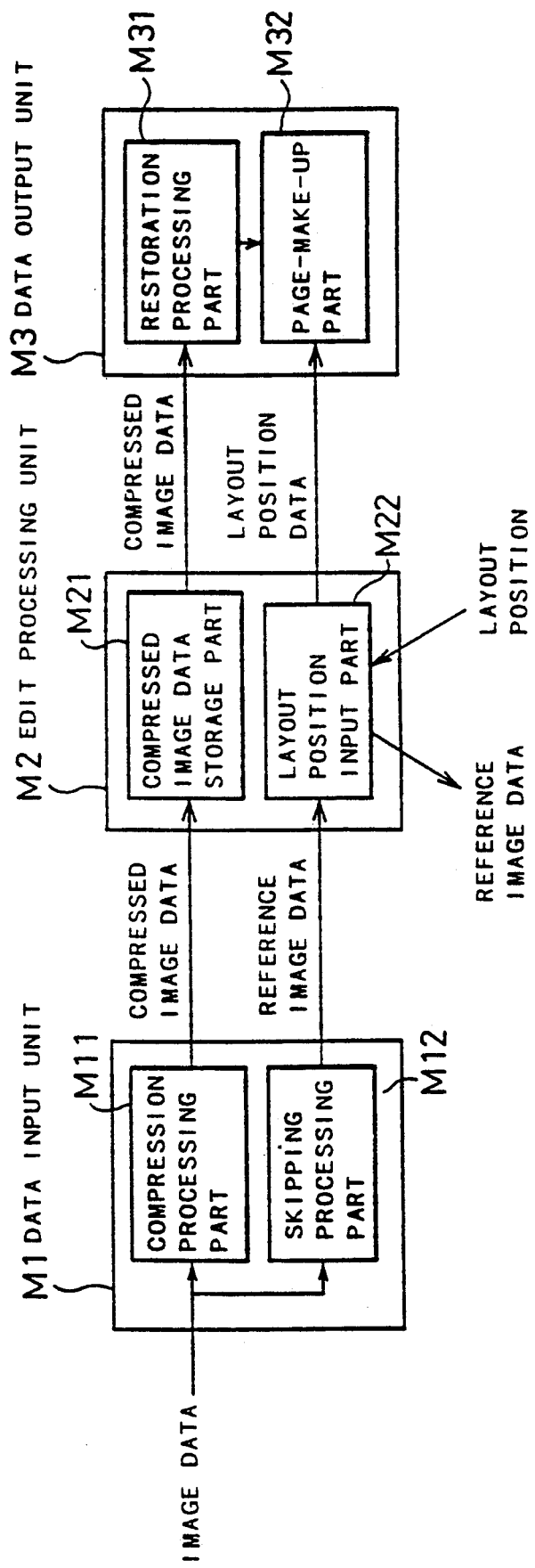
FIG. 2 shows the block diagram of an image processing system according to the present invention.

FIG. 2 shows a block diagram of an image processing system according to the present invention.

The image processing system comprises a data input unit M1 for reading picture images to be laid out in a one-page-image to obtain image data; an edit processing unit M2 for specifying layout positions of the picture images in the one-page-image; and a data output unit M3 for outputting the image data of such a one-page-image.

The data input unit M1 comprises: compression processing part M11 for producing compressed image data by compressing the read image data; and skipping processing part M12 for producing reference image data by skipping the read image data. The edit processing unit M2 comprises: compressed image data storage part M21 for storing the compressed image data; and layout position input part M22 for outputting the reference image data to the outside and receiving a layout position of the skipped image expressed by the reference image data within the one-page-image area. The data output unit M3 comprises: restoration processing part M31 for reading and restoring the compressed image data stored in the compressed image data storage part M21; and page-make-up part M32 for forming the one-page-image based on the restored image data and the layout position data.

Compressed data or skipped data, which are not original picture image data of large data volume, are stored or handled in the compressed image data storage part M21 and the edit processing unit M2. This reduces the volume of the data to be dealt with in the edit processing unit M2.

Figure 3:
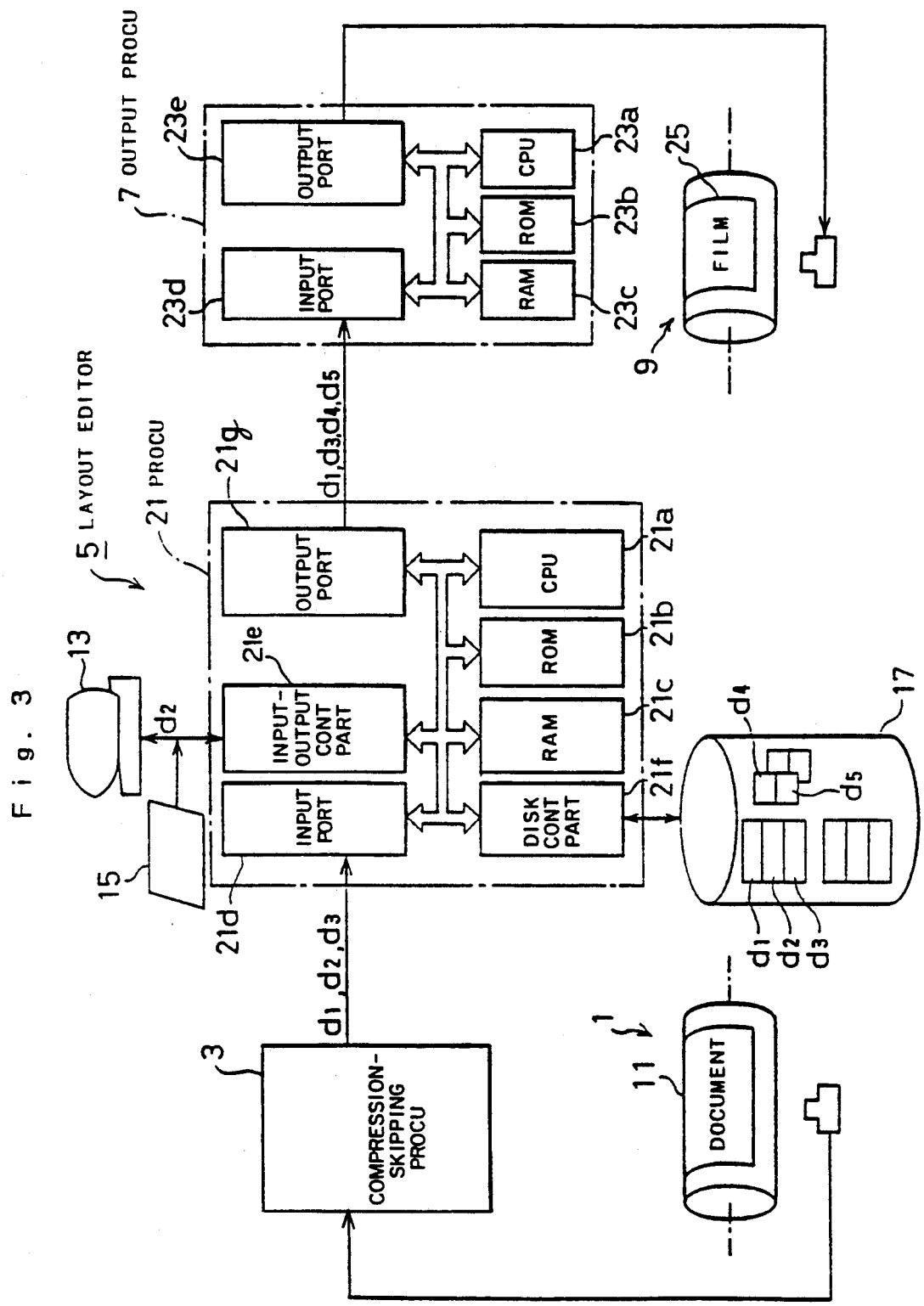
FIG. 3 shows the general configuration of an image editing system including an image processing system as a first preferred embodiment of the present invention.

FIG. 3 shows the general configuration of an image editing system including the image processing system as a preferred embodiment of the present invention.

As FIG. 3 shows, the image editing system comprises a reading scanner 1, a compression-skipping processing unit 3, a layout editor 5, an output processing unit 7 and an recording scanner 9.

The reading scanner 1 photoelectrically scans an original 11 to obtain image data in the form of color image information which represents the picture element in the original 11. The scanned image data (original image data) is supplied to the compression-skipping processing unit 3.

The compression-skipping processing unit 3 produces the following three kinds of data from the original image data:

1) Compressed image data d1 which is the compressed image data of the original image data;
2) Reference image data d2 which is skipped image data produced by skipping over some pixels or some lines of the original image data; and
3) Management data d3.

The management data d3 includes the following information for example:

3-1) Nx and Ny: the numbers of pixels in the X and Y directions, respectively
3-2) Data showing whether the image is monochrome or multi-color
3-3) Data specifying the color data system, such as RGB system and the YMCK system, by which the image is expressed
3-4) The number of data bits per pixel
3-5) Data specifying how to arrange in order the image data of all the pixels in the image (or the interleaving method)
3-6) Data specifying the compression-restoration method (the Huffman method, the MH method, the run-length method, etc.)

The compressed image data d1, the reference image data d2 and the management data d3 are supplied to the layout editor 5.

The layout editor 5 comprises a microcomputer and its peripheral equipment. It is connected to a terminal device for inputting image processing instructions and displaying processing results, a digitizer 15 for specifying coordinates of the image displayed at the terminal device 13, a magnetic disk unit 17 as an external storage device for storing various image data, and a processing unit 21 connected to these units 13, 15, and 17 for performing layout editing on reception of the data d1, d2 and d3 supplied from the compression-skipping processing unit 3.

The processing unit 21 is formed as an arithmetic and logical circuit with CPU 21a, ROM 21b, and RAM 21c. The processing unit 21 further comprises an input port 21d for receiving data from the compression-skipping processing unit 3, an input-output control part 21e for transmitting data to and from the terminal device 13 and the digitizer 15, a disk control part 21f for transmitting data to and from the magnetic disk unit 17, and an output port 21g for transmitting data to the output processing unit 7.

Figure 4:
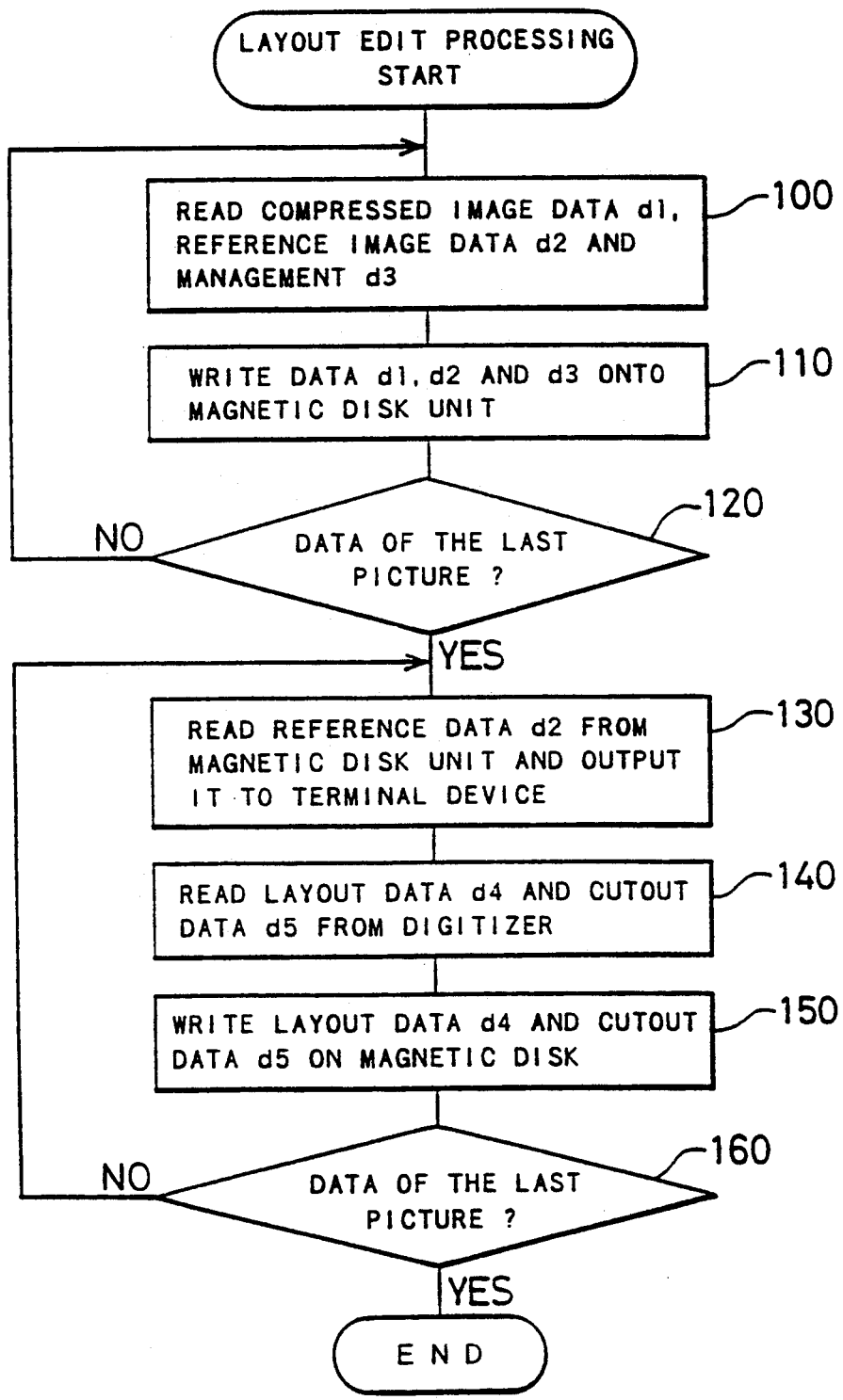
FIG. 4 shows a flowchart of layout edit processing by a processing unit of a layout editor.

The layout edit processing carried out by the processing unit 21 is outlined hereafter with concurrent reference to the flowchart shown in FIG. 4:

As FIG. 4 shows, at the beginning of the processing, the processing unit 21 reads the compressed image data d1, the reference image data d2 and the management data d3, which are produced at the compression-skipping processing unit 3, for every picture element as read by the reading scanner 1 (step 100). Next, each of the data d1, d2 and d3 for every picture element is respectively written onto the magnetic disk unit 17 (step 110). Then, it is judged whether the data handled at the steps 100 and 110 is the data for the last picture element read by the reading scanner 1 or not (step 120). If it is not, the sequence returns to the step 100, and the steps 100 to 120 are carried out for the next picture element.

If the data is judged to be that of the last picture element, the reference image data d2 is read out from the magnetic disk 17 for each picture element and is supplied to the terminal device 13 (step 130). In this way the monitor of the terminal device 13 displays the skipped image based on the reference image data d2. The skipped image is a reproduction of the original 11.

Now the operator operates an input unit, such as the digitizer 15, and lays out the picture elements on one page on the monitor screen. The processing unit 21 reads the layout data from the digitizer 15 (step 140). The layout data d4 expresses the layout positions of the picture elements on the page and the parameters for magnification, reduction and rotation of the picture elements; it also includes cutout data d5 for indicating the area of each picture element that is used as a part of the page image. The cutout data d5 comprises:

5-1) A flag indicating the on-off of cutout processing; and 5-2) Cutout shape data that is vector data representing a closed-loop defining the shape of the cutout area.

Figure 5:
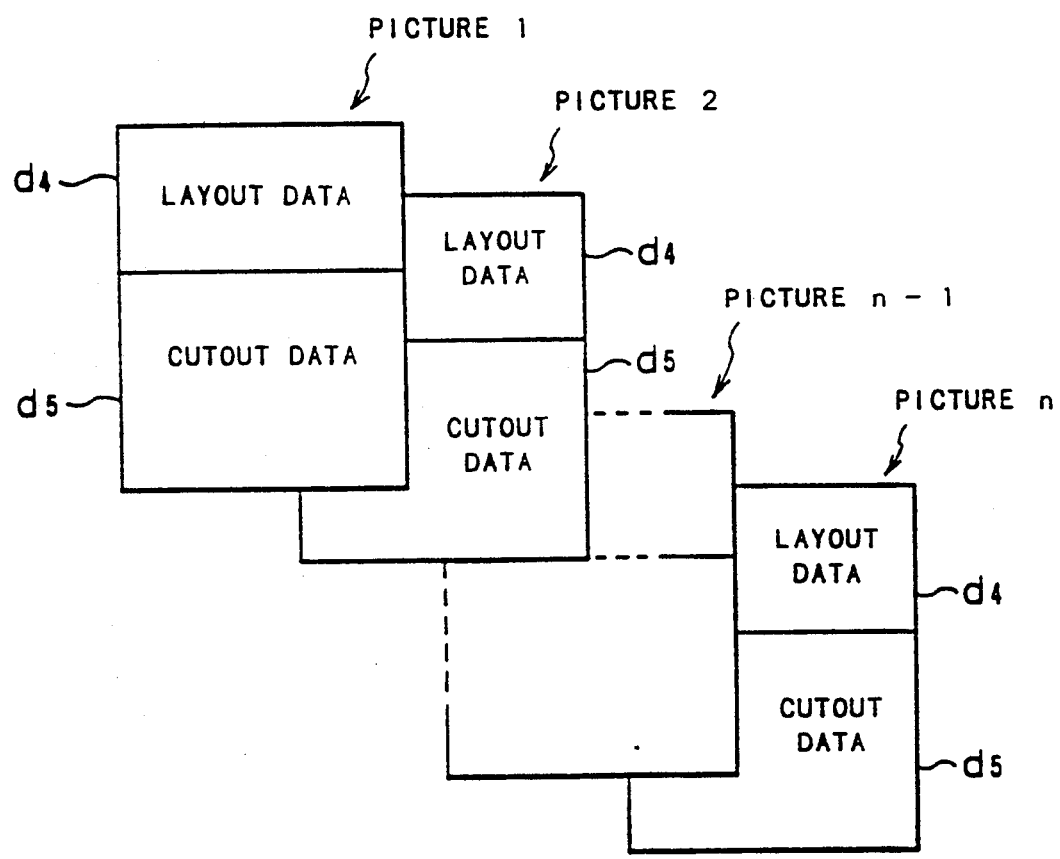
FIG. 5 shows the stored state of layout data and cutout data in a magnetic disc system.

Next, as FIG. 5 shows, the layout data d4 and the cutout data d5 are combined as a data set for each picture element and written on the magnetic disk unit 17 (step 150).

Then, it is judged whether the data handled in the steps 130 through 150 is that of the last picture element read by the reading scanner 1 or not (step 160); and if it is not, the sequence returns to the step 130 and the processing at the steps 130 to 160 is carried out again on the next picture element. If the data is judged to be that of the last picture element, this processing sequence comes to an end.

Returning to FIG. 3, the output processing unit 7 comprises a CPU 23a, a ROM 23b, a RAM 23c, an input port 23d for receiving data from the layout editor 5, and an output port 23e for outputting page image data to the recording scanner 9.

Figure 6:
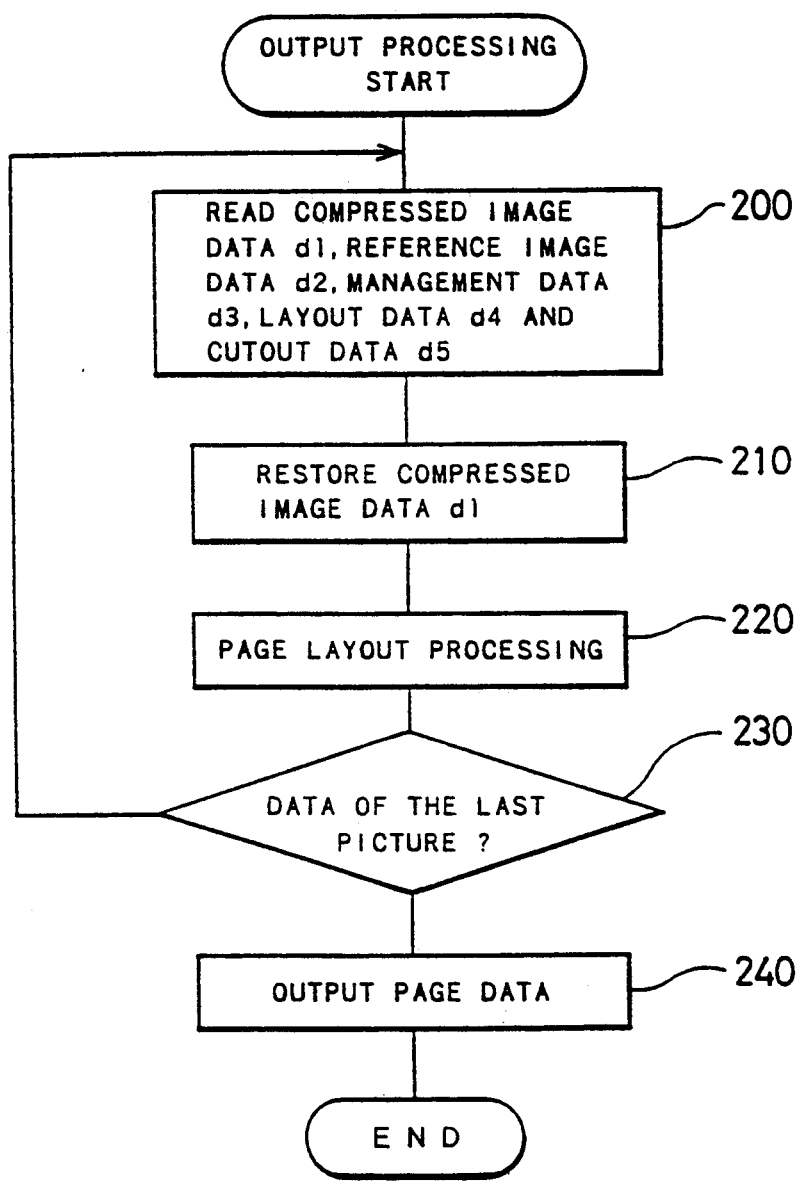
FIG. 6 shows a flowchart of output processing by a processing unit of an output processing system.

The outputting processing carried out by output processing unit 7 is outlined hereafter with concurrent reference to the flowchart shown in FIG. 6:

At the start of the processing, the output processing unit 7 reads the compressed image data d1, the management data d3, the layout data d4, and the cutout data d5 out of the magnetic disk unit 17 for each picture element read by the reading scanner 1 (step 200). Next, the read compressed data d1 is restored by the restoration method specified by the management data d3 (step 210), and page layout processing is simultaneously carried out (step 220).

The layout processing is to layout a picture element on a page according to the layout data d4 and the cutout data d5. Affine conversion, such as magnification, reduction and rotation processing, of the restored image is carried out as a part of the page layout processing according to the layout data d4. If the flag indicating the on-off of the cutout processing, which is included in the cutout data d5, is on, the inside image of the closed loop represented by the cutout shape data is laid out on the page. The page data representing the one-page-image thus formed is stored in a prescribed page area in the RAM 23c. This page data may be stored in another storage device, such as a general purpose hard disk, in place of the RAM 23c.

Then, it is judged whether the data handled at the steps 200 to 220 is that of the last picture element read by the reading scanner 1 or not (step 230); if it is not, the sequence returns to the step 200 and processing at the steps 210 to 230 is carried out again. If the data is that of the last picture element, all the picture elements read by the scanner 1 have been laid out on the page, and therefore the page data is accordingly supplied through the output port 23e to the recording scanner 9 (step 240) and then the sequence comes to an end.

The recording scanner 9 drives its exposure head and records the one-page-image on a film 25 on receiving the page data supplied from the output processing unit 7 (see FIG. 3).

The relation between the components of the above embodiments and those shown in FIG. 2 is as follows: The compression-skipping processing unit 3 corresponds to the input unit M1 and further to the compression processing part M11 and the skipping processing part M12. The layout editor 5 corresponds to the edit processing unit M2. The magnetic disk unit 17 corresponds to the compressed image data storage part M21. The layout position input part M22 is implemented by the terminal device 13, the digitizer 15, the processing unit 21, and a layout-edition processing program carried out at the processing unit 21. The output processing unit 7 corresponds to the output processing unit M3; the restoration processing part M31 and the page-make-up part M32 are implemented by an output processing program carried out by the output processing unit 7.

According to the above embodiment, the compressed image data d1 and the reference image data d2 are handled in the layout editor 5 and are stored on the magnetic disk unit 17, and they are not the original image data of a large data volume read by the reading scanner 1. Therefore, the data volume to be handled by layout editor 5 remains small, and one-page-images including high-quality picture elements can be formed with a small system utilizing a personal computer. Moreover, since the handling data volume is small, the processing speed can be increased.

Figure 7:
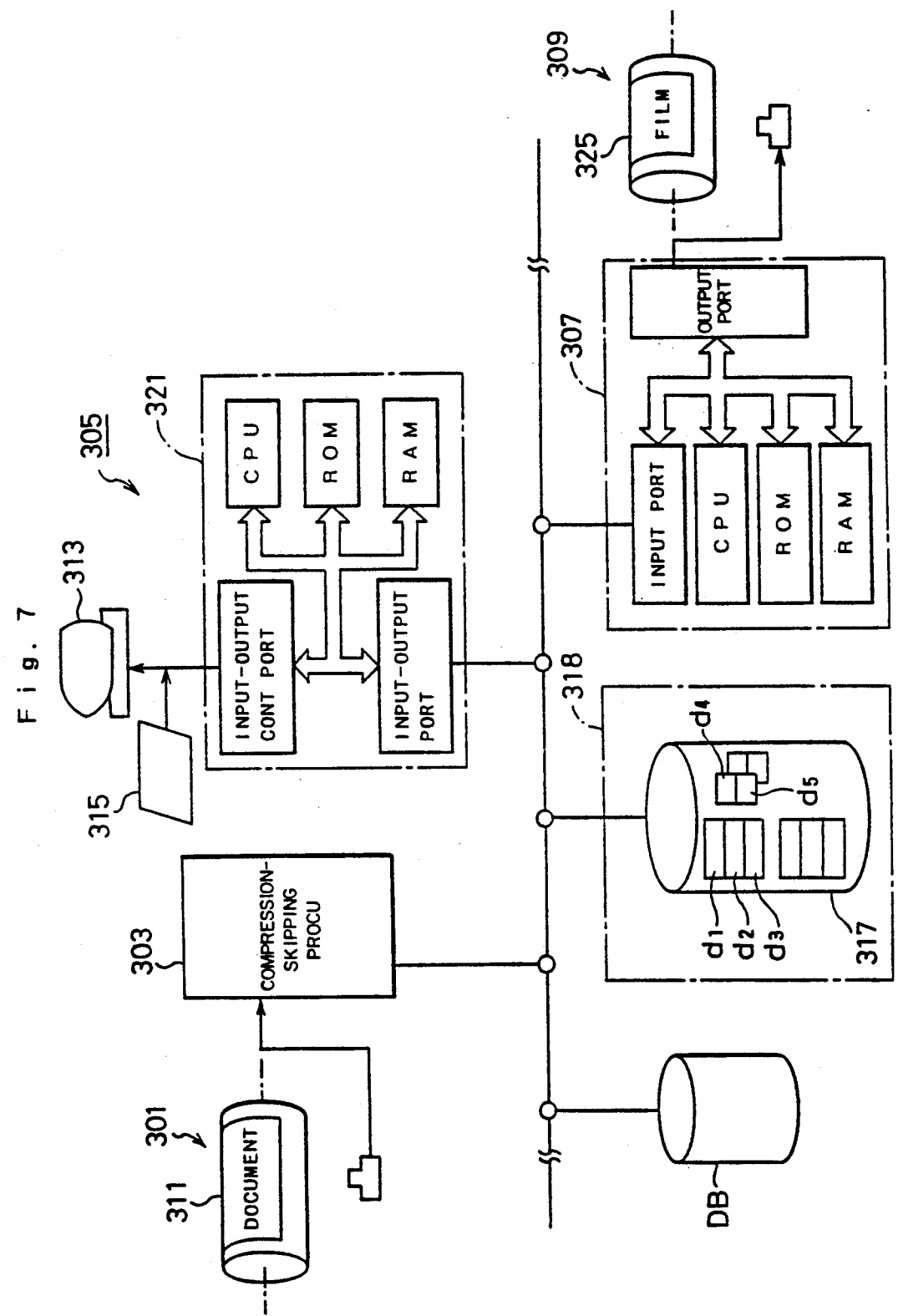
FIG. 7 shows the general configuration of an image editing system including an image processing system, in accord with a second preferred embodiment of the present invention.

FIG. 7 shows the general configuration of an image editing system including an image processing system as in accord with a second embodiment of the present invention. The image processing system is different from the first embodiment in that a compression-skipping processing unit 303, a layout editor 305, and an output processing unit 307 are mutually connected by a Local Area Network (LAN) and that a magnetic disk unit 317 is incorporated not in the layout editor 305 but in a disk server 318 connected by the LAN. In FIG. 7, the same parts as in the first embodiment are given the numbers of value with an addition of 300 to the numbers given for the first embodiment.

The compression-skipping processing unit 303, the layout editor 305 and the output processing unit 307 operate similarly to the first embodiment, and data communication between these devices including disk server 318 is carried out via the LAN.

The second embodiment achieves the same effect as the first embodiment. The first and second embodiments utilize the reading scanner 1, or 301, as means for obtaining original image data of picture elements used for one-pageimage layout; however, as FIG. 7 shows, an image data base DB which stores image data of various originals may be used in place of the scanner. The original image data read out from the image data base is supplied through LAN to the compression-skipping processing unit 303 for compression and skipping processing.

As for the configuration of the first embodiment, the layout editor 5 and the output processing unit 7 may be implemented by one computer unit.

In the image processing systems described above, the data handled therein, in laying out picture elements on a one-page-image area, are the compressed or skipped image data of a small data volume, but is not the original image data of a large data volume. Consequently, onepage-images including high-quality picture elements can be formed using a small system utilizing a microcomputer or a personal computer. Moreover, the reduction of the data volume increases the processing speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing system for forming a one-page-image including a picture element, comprising:
   input means for obtaining original image data of a picture element to be laid out as a part of a one-page-image;
   compression means for compressing said original image data to produce compressed image data;
   skipping means for skipping data of said original image data to produce reference image data representing a skipped image;
   data storage means for storing said compressed image data;
   layout means for to selectively positioning said skipped image on a representation of said one-page-image to produce layout data representing the position of said skipped image on the representation of said one-page-image, said layout data further including parameters for affine conversion of said skipped image in said one-page-image, said layout means comprising a monitor for displaying the representation of said one-page-image and a coordinate input device for specifying positions of the skipped image on the representation of said one-page-image, said layout means obtaining said layout data from a position of said skipped image on the representation of said one-page-image specified with said coordinate input device, wherein said layout means also produces cutout data representing a shape of a cutout area of said skipped image, part of said skipped image within said cutout area being laid out on the representation of said one-page-image;
   means for storing said layout data and said cutout data as a data set for the picture element;
   management data production means for producing management data to indicate a method of data compression in said compression means;
   restoration means for restoring said compressed image data stored in said data storage means to produce restored image data, wherein said restoration means restores said compressed image data according to a method indicated by said management data; and
   page-make-up means for forming said one-page-image based on said restored image data, said layout data and said cutout data.

2. An image processing system in accordance with claim 1, wherein
   said input means comprises image data storage means for storing plural sets of image data representing picture elements usable as parts of said one-page-image, and picks up image data of the picture element to be laid out from said image data storage means.

3. An image processing method of forming a one-page-image including a picture element, comprising the steps of:
   (a) obtaining original image data of a picture element to be laid out in a one-page-image;
   (b) compressing said original image data to produce compressed image data;
   (c) skipping data of said original image data to produce reference image data representing a skipped image;
   (d) displaying a representation of said one-page-image including said skipped image based on said reference image data on a monitor;
   (e) positioning said skipped image on the displayed representation of said one-page-image with a coordinate input device for specifying positions; and
   (f) obtaining said layout data from the position of said skipped image specified with said coordinate input device, said layout data including parameters for affine conversion of said skipped image in said one-page-image;
   (g) producing cutout data representing a shape of a cutout area of said skipped image, part of said skipped image within said cutout area being laid out on said one-page-image; and
   (h) storing said layout position data and said cutout data as a data set for each picture element;
   (i) producing management data to indicate a method of data compression of said compressed image data;
   (j) restoring said compressed image data to produce restored image data, said restoring being performed according to a method indicated by said management data; and
   (j) forming said one-page-image based on said restored image data, said layout data and said cutout data.

4. An image processing method in accordance with claim 3 further includes a step of:
   preparing plural sets of image data representing picture elements usable as parts of said one-page-image prior to said step (a); and
   wherein said step (a) is performed by picking up image data of the picture element to be laid out from said plural sets of image data.

* * * * *